(12) United States Patent
Huber

(10) Patent No.: US 8,932,463 B2
(45) Date of Patent: Jan. 13, 2015

(54) FILTER ASSEMBLY

(75) Inventor: Nicolas Huber, Kriegsfeld (DE)

(73) Assignee: Deere & Company, Moline, IL (US)

( * ) Notice: Subject to any disclaimer, the term of this patent is extended or adjusted under 35 U.S.C. 154(b) by 1040 days.

(21) Appl. No.: 13/002,548

(22) PCT Filed: Jul. 8, 2009

(86) PCT No.: PCT/EP2009/058670
§ 371 (c)(1),
(2), (4) Date: Apr. 8, 2011

(87) PCT Pub. No.: WO2010/003980
PCT Pub. Date: Jan. 14, 2010

(65) Prior Publication Data
US 2011/0174712 A1    Jul. 21, 2011

(30) Foreign Application Priority Data

Jul. 10, 2008   (DE) .......................... 10 2008 040 319

(51) Int. Cl.
*B01D 35/30* (2006.01)
*B01D 46/24* (2006.01)
*B01D 29/11* (2006.01)
*B01D 46/00* (2006.01)

(52) U.S. Cl.
CPC ............ *B01D 46/2411* (2013.01); *B01D 29/11* (2013.01); *B01D 46/009* (2013.01); *B01D 2201/4046* (2013.01); *B01D 2265/026* (2013.01)

USPC ........ 210/238; 210/232; 210/237; 210/416.4; 210/416.5; 210/454; 96/147

(58) Field of Classification Search
CPC ............... B01D 35/30; B01D 2201/40; B01D 2265/026; B01D 2265/029; B01D 2201/4046; B01D 2201/406
USPC .............. 210/232, 237, 238, 416, 416.5, 439, 210/440, 442, 443, 454; 96/147
See application file for complete search history.

(56) References Cited

U.S. PATENT DOCUMENTS

| 6,177,003 B1 * | 1/2001 | Jainek et al. ..................... 210/85 |
| 6,481,580 B1 | 11/2002 | Amstutz et al. |
| 7,918,997 B2 * | 4/2011 | Dworatzek et al. ........... 210/232 |
| 2010/0044295 A1 * | 2/2010 | Honermann et al. ......... 210/234 |

FOREIGN PATENT DOCUMENTS

| DE | 19644646 | 4/1998 |
| EP | 1281426 | 2/2003 |
| EP | 1693097 | 8/2006 |

\* cited by examiner

*Primary Examiner* — Nam Nguyen
*Assistant Examiner* — Claire Norris

(57) ABSTRACT

A filter assembly for filtering a liquid or gaseous medium includes a filter housing for receiving an exchangeable filter insert. The filter housing has a housing head and a housing cover that can be removably connected to the housing head by means of a connecting element. The connecting element interacts with a locking element associated with the housing head so that, for the purpose of assembly, the housing cover can be connected to the housing head only if the filter insert is located in the filter housing.

9 Claims, 4 Drawing Sheets

FILTER ASSEMBLY

FIELD OF THE INVENTION

The present disclosure relates to a filter for filtering a liquid or gaseous medium, with a filter housing for receiving an interchangeable filter insert.

BACKGROUND OF THE INVENTION

Filters for cleaning liquid or gaseous media in motor vehicles are used in a very wide variety of embodiments, for example as oil filters for operating a combustion engine. In order to ensure consistent lubrication of the combustion engine, burnt oil fractions, metal abrasion and other contaminants are filtered out by means of a suitable oil filter. For this purpose, the oil filter is located in an oil supply circuit connected to the combustion engine.

In this context, the publication DE 100 46 494 A1 discloses a filter assembly for filtering in particular oil for lubricating an internal combustion engine of a motor vehicle. The filter assembly consists of a filter housing, a filter cover and a filter insert arranged in the filter housing. The filter cover can be connected in a liquid-tight manner to the filter housing by means of a screw connection, wherein the filter insert can be interchanged if the need arises by unscrewing of the filter cover.

The filter insert, which is generally designed as a disposable article, has, as the element active in the filtering, an open-pored paper membrane which is folded in a zigzag-shaped manner and through which the oil to be filtered passes during the operation of the motor vehicle. Since the surface of the paper membrane becomes clogged with contaminants over the course of time, regular replacement of the filter insert is needed during maintenance work in order to avoid the throughflow or filter capacity being impaired. In this case, the used filter insert is disposed of and replaced by a new one.

If, during such maintenance work, the filter insert is removed from the filter housing but the fitting of a new filter insert is forgotten and, as a consequence, the filter assembly is operated with the filter insert missing, there is the possibility of contaminated oil being able to pass unnoticed into the motor vehicle units connected to the filter assembly.

SUMMARY

According to an aspect of the present disclosure, a filter assembly is provided so that inadvertent operation when a filter insert is missing can be prevented or at least made more difficult.

The filter assembly for filtering a liquid or gaseous medium comprises a filter housing for receiving an interchangeable filter insert, wherein the filter housing has a housing head and a housing cover which can be releasably connected to the housing head by means of a connecting element. The connecting element interacts with a locking element, which is mounted in the housing head, in such a manner that the housing cover can be connected to the housing head, for the purpose of assembly, only if a filter insert is located in the filter housing.

Accordingly, it is not possible to assemble the filter housing and therefore inadvertently operate the filter assembly if the filter insert is missing.

The filter assembly is, for example, an oil filter, a fuel filter or a hydraulic fluid filter of a motor vehicle. However, the filter assembly may also be used to filter any other operating fluid of the motor vehicle or to clean gaseous media, for example for use as an air filter or the like.

The filter assembly in this case is suitable for use in any type of motor vehicle, in particular in agricultural motor vehicles, such as tractors, harvesting machines, mowing machines or the like.

The locking element comprises in particular a blocking element which takes up a predetermined blocking position if the filter insert is missing from the filter housing, the blocking element in the predetermined blocking position blocking assembly of the filter housing.

If a filter insert is located in the filter housing, the blocking element takes up a release position which differs from the predetermined blocking position and in which blocking of the connecting element is canceled and the filter housing can be assembled.

The blocking element is preferably part of a mechanical locking element. However, it is also conceivable for the blocking element to be part of an electric and/or electromechanical locking element. In this case, the locking element may have an electric and/or electromechanical actuating element, by means of which the blocking element can be transferred between the predetermined blocking position and the release position.

The advantage of a mechanical locking element, i.e. a locking element formed with the use exclusively of mechanical components, is that said locking element can operate without current and therefore independently of a power supply of the motor vehicle.

The housing head comprises in particular a connecting piece for producing a releasable pressure connection to the filter insert, the blocking element being transferred from the predetermined blocking position into the release position when the pressure connection is produced between the filter insert and the connecting piece.

On the other hand, upon release of the pressure connection between the filter insert and connecting piece, the blocking element returns automatically under the action of a restoring force exerted by the locking element, in particular independently of a particular fitted position of the filter assembly in the motor vehicle, from the release position into the predetermined blocking position. The restoring force is applied, for example, by a spring-elastic restoring means which interacts with the blocking element and is part of the locking means.

Furthermore, it is possible for the locking element to comprise an actuating element, the filter insert being brought into contact with the actuating element in such a manner that, when the pressure connection is produced between the filter insert and connecting piece, the blocking element, which is connected to the actuating element, is transferred from the predetermined blocking position into the release position counter to the action of the restoring force of the spring-elastic restoring means.

The connecting piece of the housing head can at the same time take on the function of a supply line of the liquid or gaseous medium to be filtered or—depending on the application—of a removal line of the filtered liquid or gaseous medium, for which purpose the connecting piece can be connected in a pressure-tight manner to the filter insert via a connecting flange formed on the filter insert. The pressure connection can be produced, for example, by means of a screw thread or by the use of a plug-in coupling.

The connecting element provided between the housing head and housing cover is preferably a screw thread. The screw thread is designed in particular as a fine-pitch thread. In the predetermined blocking position, a free end of the blocking element is positioned in relation to an internal thread formed on the housing head or in relation to a portion of the internal thread in such a manner that screwing together of the filter housing is blocked. In this case, the blocking element is in particular in the form of a blocking arm.

In more precise terms, the blocking element covers at least some of the turns of the internal thread of the housing head such that a mating thread or external thread formed on the housing cover cannot enter into engagement therewith. In this case, upon the attempt to assemble the filter housing, the housing cover cannot be screwed onto the housing head. The free end of the blocking element here can either rest directly, in particular with a predetermined press-on force, on the turns of the internal thread or else can have a position spaced apart therefrom.

The actuating element preferably forms an extension which projects into the interior of the housing head and, when the pressure connection is produced between the filter insert and connecting piece, comes into contact with the filter insert in such a manner that the blocking element is carried along releasing the internal thread formed on the housing head. In this case, the actuating element is in particular in the form of an actuating arm.

The actuating element may furthermore be of fork-shape design. In addition or as an alternative, there is the option for the actuating element to have a free end with a crimped border region for contact with the filter insert. In both cases, there is an enlarged contact surface between the actuating element and filter insert. Possible damage of the filter insert can therefore be avoided.

The filter housing is designed preferably for receiving a cylindrical filter insert. In this case, a multiplicity of locking elements can be distributed along a cylindrical inner circumference of the housing head. The locking elements can in particular be distributed uniformly. Between three and seven locking elements can be provided depending on the outside diameter of the filter insert and the resultant inner circumference of the housing head.

The locking element can be an integral part of a support element formed from spring-elastic material. The spring-elastic material is typically stainless spring steel or spring steel surface-treated in a comparable manner. In particular, the locking element is produced by punching out and subsequently punching of a continuous piece of material. In this case, the actuating element forms a leaf-spring-like and consequently spring-elastic restoring means, the relaxed state of which corresponds to the predetermined blocking position of the blocking element.

The support element can be held under pre-stress in a groove formed on the inner circumference of the housing head. Additional fastening means, such as screws, rivets or a welding connection, are unnecessary in this case.

The housing head of the filter assembly is generally mounted on the vehicle and has an inlet for the supply and an outlet for the removal of the liquid or gaseous medium which is to be filtered or has been filtered. The filter assembly is preferably located in an engine compartment of the motor vehicle such that said filter assembly can easily be reached during maintenance work for the purpose of interchanging the filter insert.

In order to facilitate the removal of the housing cover and therefore the interchanging of the filter insert, the housing cover can have a removal means, for example a knurled gripping surface and/or a polygonal bolt for the engagement of a removal tool. The removal means at the same time simplifies assembly of the filter housing after the filter insert has been interchanged.

The filter housing is produced, for example, from metal or from a suitable plastic by injection molding.

In order to prevent operation of the filter assembly with an unsuitable filter insert or at least to make operation difficult, there is the possibility for the filter insert to comprise a first safety feature which interacts with a second safety feature, which is mounted in the filter head, in such a manner that the filter housing can be assembled only if the first and the second safety feature have mutually corresponding mechanical properties.

BRIEF DESCRIPTION OF THE DRAWINGS

FIG. 1b is a detailed view of a portion of FIG. 1a.

DETAILED DESCRIPTION OF THE DRAWINGS

Figure 1A:
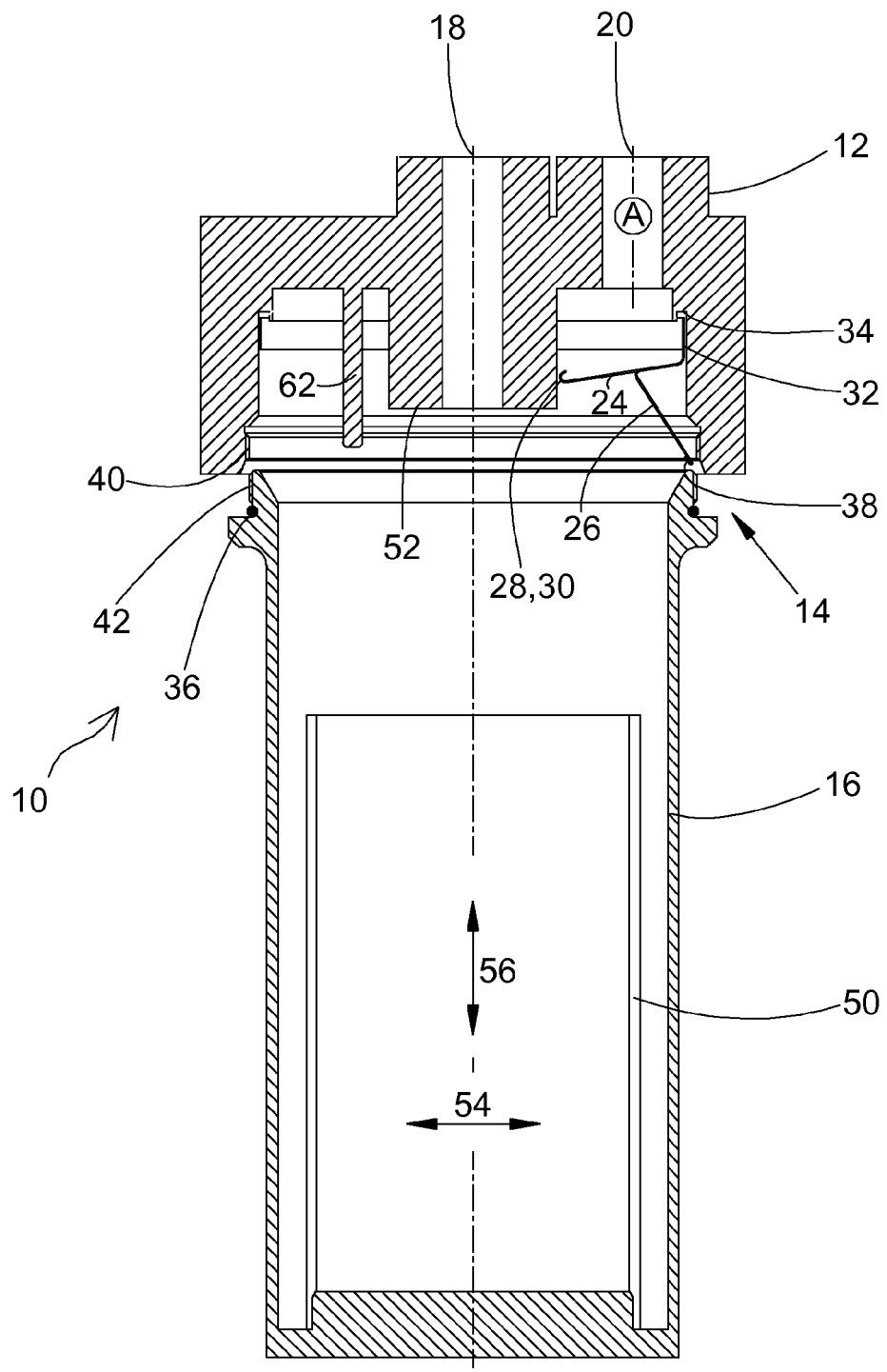
FIG. 1a is a cross sectional view of a filter assembly with a filter insert removed.
Figure 1B:
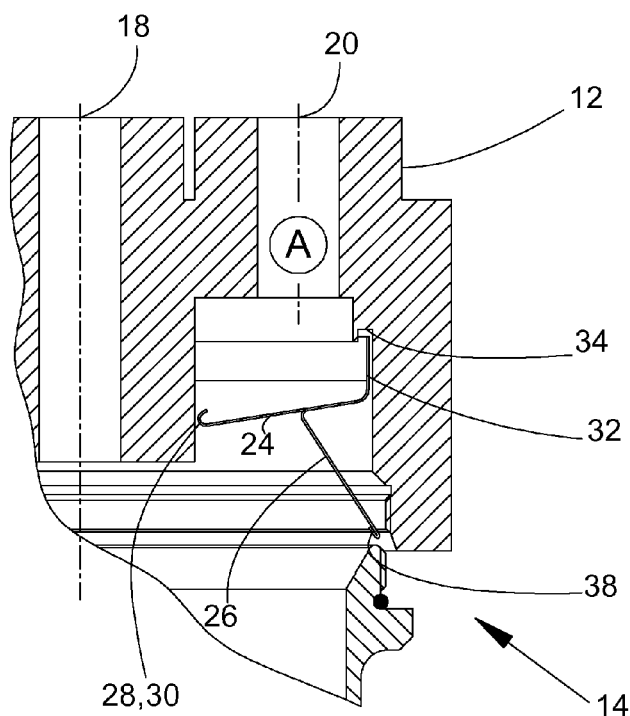
Figure 2:
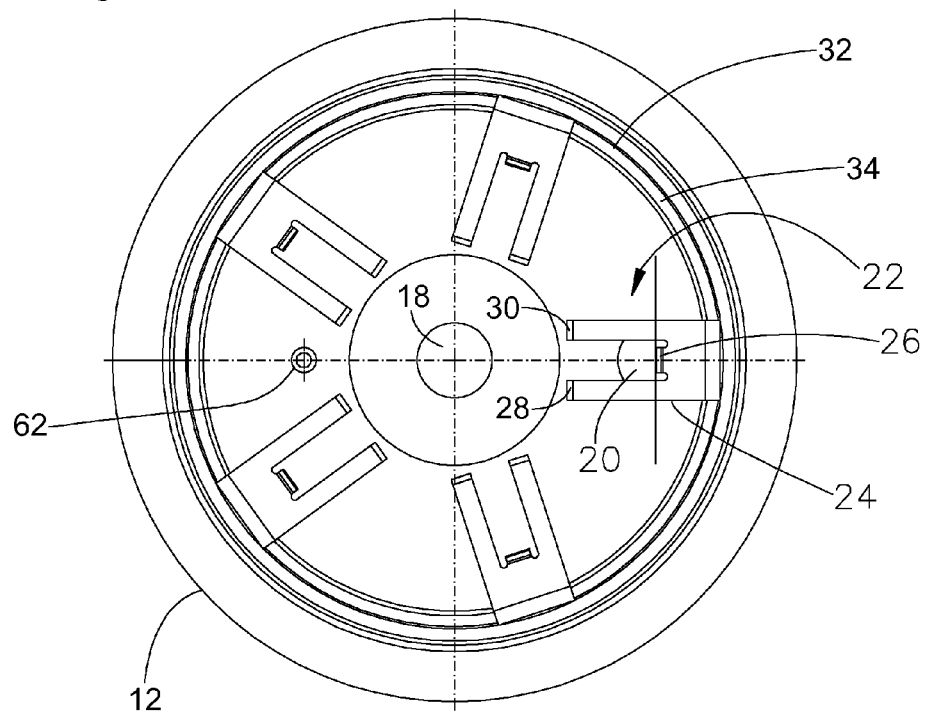
FIG. 2 is a top view of the interior of a housing head of the filter assembly with the housing cover removed.

FIGS. 1a and 1b show a filter assembly, such as an oil filter for a combustion engine of an agricultural motor vehicle (not illustrated), but may also serve to filter any other operating fluid of the motor vehicle, for example a fuel provided for operating the combustion engine or a hydraulic fluid used for driving additional units of the motor vehicle. Alternatively, it could be used in the form of an air filter or the like. The agricultural motor vehicle is, for example, a tractor, a harvesting machine, a mowing machine or the like.

The filter assembly is preferably located in an engine compartment (not illustrated) of the motor vehicle, in particular in the region of an oil sump of the combustion engine. The filter assembly is preferably arranged vertically in the engine compartment but may also have any other arrangement or fitted position arising from the structural or design requirements of the particular intended use.

The filter assembly consists of a filter housing 10 which is designed for receiving an interchangeable filter insert 44, a housing head 12 which is mounted on the vehicle, and a cup-shaped housing cover 16 which can be releasably connected to the housing head 12 by means of a connecting element 14.

In order to remove the housing cover 16, the latter has a removal means (not illustrated) in the form of a knurled gripping surface on its outer circumference and/or in the form of a polygonal bolt (not illustrated) for the engagement of a removal tool.

Furthermore, a first port 18 for supplying dirty oil which is to be filtered and a second port 20 for removing the filtered or cleaned oil are formed on the housing head 12. The ports 18 and 20 each have an internal thread (not illustrated) for producing a pressure-tight connection to oil lines (not illustrated) of the motor vehicle.

The components of the filter housing 10, in particular the housing head 12 and the housing cover 16, are produced from metal or a suitable plastic by injection molding.

The filter housing 10 receives a cylindrical filter insert 44. A multiplicity of locking elements 22 are distributed along a cylindrical inner circumference of the housing head 12. In the present case, a total of five locking elements 22 are provided. However, any other number of locking elements 22 may be involved depending on the outside diameter of the filter insert.

The locking elements 22 each have an actuating element or actuating arm 24, and a blocking element or blocking arm 26 emerging substantially at right angles from the actuating arm 24 in the direction of the connecting element 14.

The actuating arm 24 projects into the interior of the housing head 12, wherein the actuating arm 24 in the present case is of fork-shape design and has two free ends 28 and 30 with a respectively crimped border region.

Each of the locking elements 22 is an integral part of a support element 32 formed from spring-elastic material. The support element 32 is in the form of a band, along which the locking elements 22 are arranged and spring up. The locking elements 22 are produced by punching out and subsequently punching a continuous piece of material. In this case, the actuating arm 24 forms a leaf-spring-like and consequently spring-elastic restoring means which, in the relaxed state, automatically takes up a predetermined blocking position A.

According to the example, the support element 32 is held under pre-stress in a groove 34 which encircles around the inner circumference of the housing head 12. The groove 34 here may in particular have an undercut (not illustrated) which is formed for producing a latching connection to the support element 32 in such a manner that damage-free removal of the support element 32 is made more difficult.

The spring-elastic material may preferably be a stainless spring steel or a spring steel which is surface-treated in a comparable manner.

According to the example, the connecting element 14 provided between the housing head 12 and the housing cover 16 is designed as a screw thread, wherein an encircling rubber seal 36 is provided on the housing cover 16 to produce a pressure-tight connection to the housing head 12. In the blocking position A predetermined by the relaxed state of the actuating arm 24, a free end 38 of the blocking arm 26 is positioned at a distance from an internal thread 40, which is formed on the housing head 12, in such a manner that screwing together of the filter housing 10 is blocked. In more precise terms, the blocking arm 26 covers at least some of turns of the internal thread 40 such that engagement of a mating thread or external thread 42 formed on the housing cover 16 is not possible. As an alternative, the free end 38 of the blocking arm 26 can rest with a predetermined press-on force on the turns of the internal thread 40.

Figure 3A:
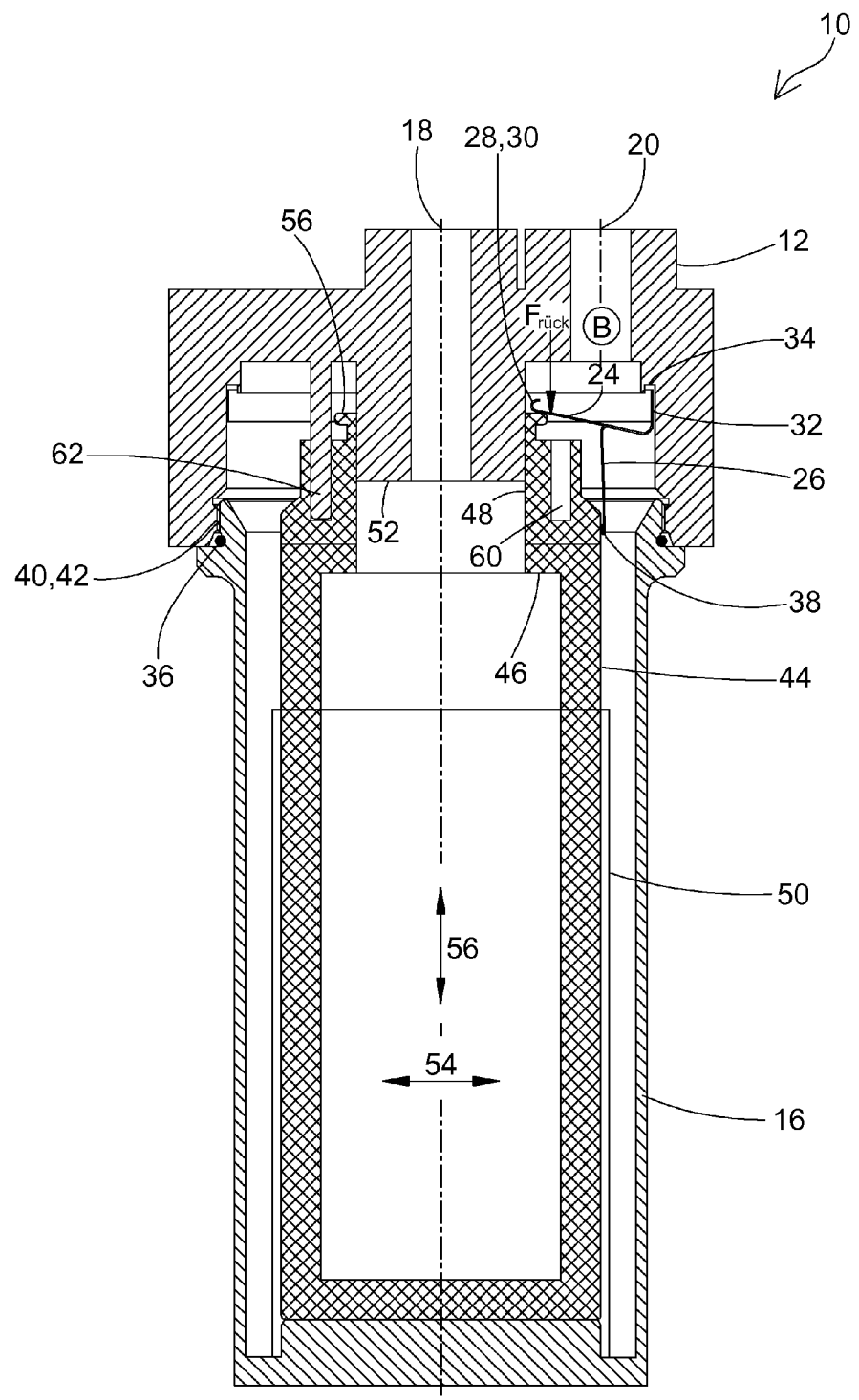
FIG. 3a is a cross sectional view of the filter assembly with a filter insert located therein.
Figure 3B:
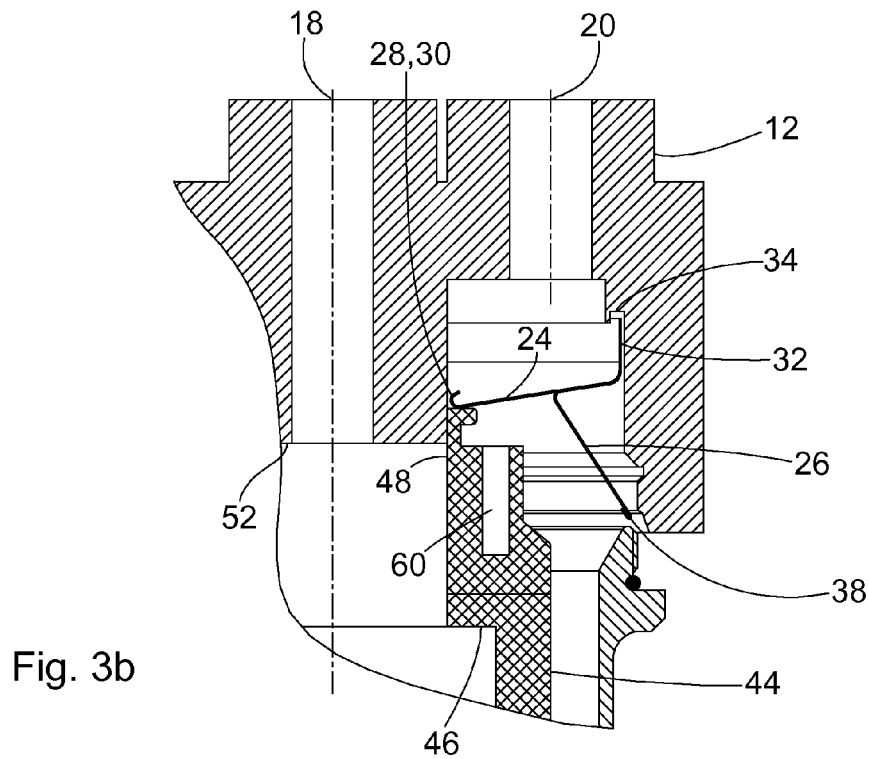
FIG. 3b is a detailed view of the filter assembly of FIG. 3a prior to the housing cover being screwed onto the housing head.
Figure 3C:
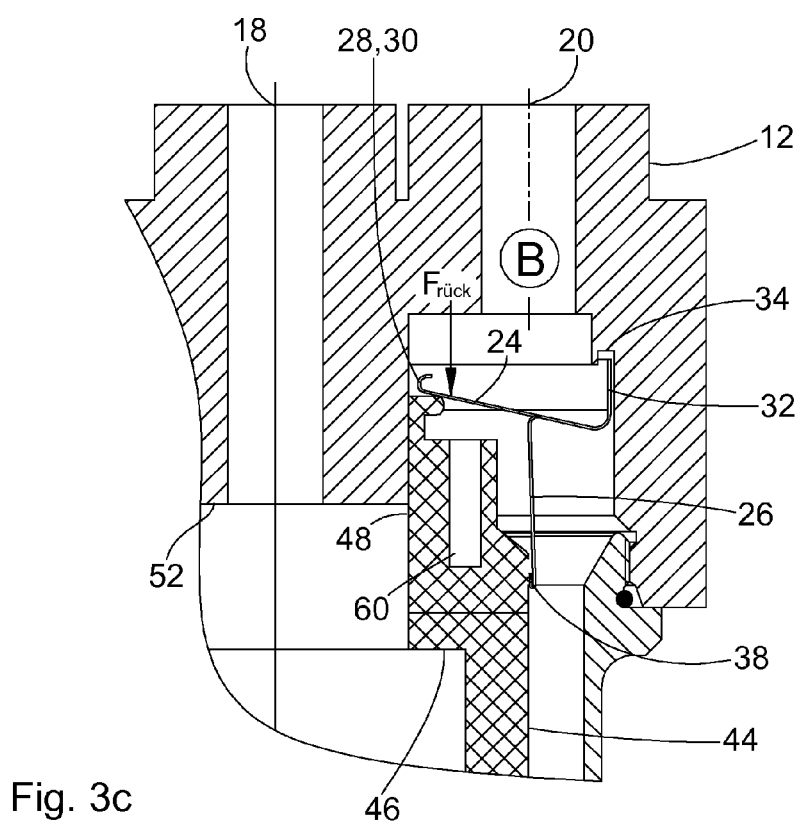
FIG. 3c is a detailed view of the filter assembly of FIG. 3a with the housing cover fully screwed onto the housing head.

FIG. 3 shows a cross sectional view of the filter assembly with a filter insert 44 located therein. Furthermore, FIG. 3b shows a detailed view of the filter before the housing cover 16 is screwed onto the housing head 12, and FIG. 3c shows a detailed view of the filter assembly with the housing cover 16 fully screwed onto the housing head 12.

The filter insert 44, which is designed as a disposable article, has, as the element active in the filtering, an open-pored paper membrane (not illustrated) which is folded in a zigzag-shaped manner and through which the oil to be filtered during operation of the combustion engine passes. The folds of the paper membrane are supported by a plastics fabric. The paper membrane is folded in such a manner that the latter forms a cylindrical filter cartridge, wherein the inside and outside of the paper membrane of the cylindrical filter cartridge are twisted in relation to each other in order to increase the effective filter surface.

On a fastening plate 46 fixedly connected to the cylindrical filter cartridge there is a connecting flange 48 for introducing the dirty oil which is to be filtered. The connecting flange 48 is an integral part of the fastening plate 46 and is produced from plastic by injection molding. During the operation of the filter assembly, the oil which is to be filtered passes under pressure in the radial direction 54 through the paper membrane from the inside to the outside. The filtered-out contaminants remain in the interior of the filter insert 44 and can be disposed together therewith.

Before the assembly or screwing together of the filter housing 10, the filter insert 44 is inserted into a holder 50 arranged in the interior of the filter cover 16. The holder 50 consists of a perforated metal cylinder for receiving the filter insert 44. The perforated metal cylinder serves at the same time to mechanically stabilize and support the paper membrane during the passage therethrough of the pressurized oil to be filtered.

Furthermore, the housing head 12 includes a connecting piece 52 which projects into the interior of the filter housing 10 and produces a releasable pressure connection to the filter insert 44. The connecting piece 52 also forms a supply line for the oil to be filtered, for which purpose the connecting piece can be connected in a liquid-tight manner to the connecting flange 48 of the filter insert 44 by means of a plug-in coupling. The end of the connecting piece 52 protrudes in the axial direction 58 beyond the two free ends 28 and 30 of the actuating arm 24 in the predetermined blocking position A such that, when the filter housing 10 has been screwed together, the filter insert 44 is guided in the radial direction 54.

As an alternative, the releasable pressure connection can also be produced by means of a screw thread instead of a plug-in coupling. In this case, in order to assemble the filter housing 10, the filter insert 44 is screwed in a pressure-tight manner to the connecting piece 52 of the filter head 12 in a first step and then, in a second step, the housing cover 16 is connected to the housing head 12.

In this case, the unlocking of the locking element 22, i.e. the canceling of the blocking of the connecting element 14, takes place in each case in the same manner described below.

According to FIG. 3a, during production of the pressure connection between the filter insert 44 and the connecting piece 52 of the filter head 12, a border region 56 formed on the connecting flange 48 of the filter insert 44 is brought into contact with the crimped ends 28 and 30 of the actuating arm 24 so that, when the filter insert 44 is plugged on or screwed down, with the internal thread 40 formed on the housing head 12 being released, the actuating arm 24 and, with the latter, the blocking arm 26 is actuated and deflected in the axial direction 58.

The blocking arm 26 is therefore transferred from a relaxed state, and therefore from the predetermined blocking position A counter to a restoring force Frest applied on account of the spring-elastic properties of said blocking arm, into a release position B which differs from the blocking position, and in which the blocking of the connecting element 14 is canceled and the internal thread 40 on the housing head 12 is released, and the housing cover 16 and housing head 12 can be screwed together. According to FIG. 3b, in release position B, the blocking arm 26 bears against the outer circumference of the connecting flange 28 of the filter insert 44. If, conversely, the pressure connection between the filter insert 44 and the connecting piece 52 of the filter head 12 is released for the purpose of interchanging the filter insert 44, the actuating arm 24 automatically returns back into the relaxed state under the action of the restoring force Frest and therefore into the predetermined blocking position A.

In summary, the connecting element 14 interacts with the locking element 22 so that the housing cover 16 can be connected to the housing head 12, for the purpose of assembly, only if a filter insert 44 is located in the filter housing 10. In order to unblock the connecting element 14, when the pressure connection is produced between the filter insert 44 and the connecting piece 52 of the housing head 12, the locking element 22 is actuated by means of the filter insert 44 in the housing cover 16 in such a manner that the blocking of the connecting element 14 is canceled.

According to FIGS. 3a to 3c, the connecting flange 48 of the filter insert 44 furthermore has an encircling groove 60 which extends in the axial direction 56 of the filter insert 44 and in which a lug 62 which is formed on the housing head 12 and corresponds to the dimensions and/or the arrangement of the groove 60 engages when the pressure connection is produced between the filter insert 44 and connecting piece 52.

If the groove 60 is missing or does not correspond, plugging of the filter insert 44 onto or screwing thereof down on the connecting piece 52 of the filter head 12 is blocked in the axial direction 58 so that the border region 56 of the connecting flange 48 does not come into contact with the crimped ends 28 and 30 of the actuating arm 24 and is capable of deflecting said actuating arm from the predetermined blocking position A in the direction of the release position B only to an inadequate extent without the blocking of the connecting element 14 being canceled. It is therefore not possible for the filter housing 10 to be assembled with an unsuitable filter insert 44.

In other words, the groove 60 formed in the filter insert 44 forms a first safety feature and the lug 62 of the filter head 12 forms a second safety feature in accordance with the "lock and key" principle, wherein the filter insert 44 can be connected to the connecting piece 52 of the filter head 12 only if the first and the second safety feature have mutually corresponding mechanical properties.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A filter assembly for filtering a liquid or gaseous medium, the filter assembly comprising:
a filter housing for receiving a removable filter insert, the filter housing having a head and a cover which can be releasably connected to the head, the head having a connection portion which is engagable with a connection portion of the cover, the head having a recess which opens towards the cover, the head having a lip which projects into the recess and forms a groove which opens towards the cover; and
a plurality of locking elements mounted in the recess, each locking element comprising an actuating arm, a support arm and a blocking arm, the support arm projecting from the actuating arm and having an end which is received by the groove, the blocking arm projecting from the actuating arm towards the connecting portions, the blocking arm being located in a blocking position between the connecting portions to prevent attachment of the cover to the head when the filter insert is absent from the cover, and when the filter insert is received by the cover, the filter insert engages the actuating arm and moves the locking element to an unlocked position wherein the blocking arm is moved away from the blocking position.

2. The filter assembly of claim 1, wherein:
the head has a connecting piece for producing a releasable pressure connection to the filter insert, the filter insert moving the blocking arm from the blocking position into the release position when the filter insert is connected to the connecting piece.

3. The filter assembly of claim 2, wherein:
upon release of the pressure connection between the filter insert and the connecting piece, the blocking arm returns automatically to the blocking position.

4. The filter assembly of claim 1, wherein:
the actuating element is fork-shaped and has a free end with a crimped border region for contact with the filter insert.

5. The filter assembly of claim 1, wherein:
the connection portion of the cover has a screw thread;
the connection portion of the head has an internal thread; and
the blocking arm has a free end, and when the blocking arm is in the blocking position the free end is positioned in relation to the internal thread to prevent the head and the cover from being screwed together.

6. The filter assembly of claim 5, wherein:
the free end of the blocking arm is movable from a first position wherein it is engages the internal thread and to a second position spaced apart therefrom.

7. The filter assembly of claim 1, wherein:
the filter housing receives a cylindrical filter insert; and
the locking elements are distributed along a cylindrical inner circumference of the head.

8. The filter assembly of claim 1, wherein:
each locking element is formed from spring-elastic material.

9. The filter assembly of claim 1, wherein:
the filter insert is an oil filter, a fuel filter, a hydraulic fluid filter or an air filter of a motor vehicle.

* * * * *